(12) United States Patent
Inagaki

(10) Patent No.: US 8,514,858 B2
(45) Date of Patent: Aug. 20, 2013

(54) PACKET TRANSMISSION DEVICE, PACKET TRANSMISSION METHOD AND COMPUTER PROGRAM PRODUCT STORED ON NON-TRANSITORY COMPUTER-READABLE MEDIUM

(75) Inventor: Tomohiro Inagaki, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 117 days.

(21) Appl. No.: 12/967,636

(22) Filed: Dec. 14, 2010

(65) Prior Publication Data

US 2011/0188498 A1 Aug. 4, 2011

(30) Foreign Application Priority Data

Jan. 29, 2010 (JP) ................................. 2010-017911

(51) Int. Cl.
*G01R 31/08* (2006.01)
(52) U.S. Cl.
USPC ............ 370/389; 370/230; 370/252; 370/352
(58) Field of Classification Search
USPC ................................................. 370/401, 252
See application file for complete search history.

(56) References Cited

U.S. PATENT DOCUMENTS

| | | | |
|---|---|---|---|
| 6,292,465 B1 * | 9/2001 | Vaid et al. ...................... | 370/230 |
| 6,757,255 B1 * | 6/2004 | Aoki et al. ..................... | 370/252 |
| 7,200,141 B2 * | 4/2007 | Chatterjee ...................... | 370/352 |
| 7,342,897 B1 * | 3/2008 | Nader et al. ................... | 370/255 |
| 7,359,337 B2 | 4/2008 | Fukuda | |
| 7,746,778 B2 * | 6/2010 | Chilukoor et al. .......... | 370/230.1 |
| 7,782,794 B2 * | 8/2010 | Sebastian ...................... | 370/253 |
| 8,127,041 B2 * | 2/2012 | Leung et al. .................. | 709/235 |
| 8,130,752 B2 * | 3/2012 | Ou et al. ........................ | 370/352 |
| 2006/0039302 A1 * | 2/2006 | Sturrock et al. .............. | 370/282 |
| 2009/0059958 A1 | 3/2009 | Nakata | |

FOREIGN PATENT DOCUMENTS

| | | |
|---|---|---|
| JP | B2-3390033 | 1/2003 |
| JP | A-2004-254025 | 9/2004 |
| JP | A-2008-258877 | 10/2008 |
| JP | A-2009-118272 | 5/2009 |
| WO | WO 03/053011 A1 | 6/2003 |
| WO | WO 2007/083687 A1 | 7/2007 |

OTHER PUBLICATIONS

Tsugawa et al., "Implementation and evaluation of an inline network measurement algorithm and its application technique," *Technical report of the Institute of Electronics, Information and Communication Engineers*, 2005, pp. 79-84 (with abstract).

Le Thanh Man et al., "A study on Inline Network Measurement Mechanism for Service Overlay Networks," *Technical Report of the institute of Electronics, Information and Communication Engineers*, 2003, pp. 53-58, vol. 102, No. 565 (with abstract).

* cited by examiner

*Primary Examiner* — Warner Wong
*Assistant Examiner* — Lakeram Jangbahadur
(74) *Attorney, Agent, or Firm* — Oliff & Berridge, PLC (57) ABSTRACT

A packet transmission device that transmits packets for measuring an available bandwidth and that includes a first packet creation portion that creates a first packet including bandwidth measurement data, a second packet creation portion that creates at least one second packet such that a sum of data sizes of the first packet and the at least one second packet to be created is within a predetermined range including a target value, a setting portion that sets a transmission interval for the first packet, a first transmission portion that transmits the first packet at a first timing specified by the transmission interval, and a second transmission portion that transmits the at least one second packet at a second timing that is a timing after the first timing and before a time when the transmission interval has elapsed from the first timing.

20 Claims, 10 Drawing Sheets

PACKET TRANSMISSION DEVICE, PACKET TRANSMISSION METHOD AND COMPUTER PROGRAM PRODUCT STORED ON NON-TRANSITORY COMPUTER-READABLE MEDIUM

CROSS-REFERENCE TO RELATED APPLICATION

This application claims priority to Japanese Patent Application No. 2010-017911, filed Jan. 29, 2010, the disclosure of which is hereby incorporated by reference in its entirety.

BACKGROUND

The present invention relates to a packet transmission device that transmits packets for measuring a bandwidth that is available when data communication is performed via a network, a packet transmission method and a computer program product stored on a non-transitory computer-readable medium.

Communication devices are known that transmit and receive data via a network such as the Internet. It is preferable for the communication devices to transmit and receive data at a transmission rate that is appropriate for an available bandwidth for the communication devices. The available bandwidth for the communication devices varies depending on conditions including a region, a provider and a time zone. Given this, in order to control the transmission rate in accordance with a variable available bandwidth, a packet transmission method has been proposed that determines whether or not a current transmission rate is appropriate for the available bandwidth. With the method, packets for the above determination (each of these packets is hereinafter referred to as a "determination packet") are transmitted and received in a communication system, and the available bandwidth and the current transmission rate are compared.

More specifically, a transmission-side communication device transmits the determination packets each including, as transmission time, time information that enables acquisition of a transmission interval of the determination packets. When a receiving-side communication device receives each of the determination packets transmitted from the transmission-side communication device, the receiving-side communication device acquires a reception time. The receiving-side communication device calculates a reception interval using the reception times, and calculates the transmission interval using the transmission times. Further, the receiving-side communication device compares a difference between the reception interval and the transmission interval with a threshold value, and thereby determines whether or not the current transmission rate is appropriate for the available bandwidth.

Further, a bandwidth measurement method has been proposed to measure a variable available bandwidth. In this bandwidth measurement method, at timings to measure the available bandwidth, a transmission-side communication device continuously transmits a plurality of packets while changing the transmission intervals. The receiving-side communication device records reception intervals of the packets. The receiving-side communication device calculates differences between the transmission intervals and the corresponding reception intervals, and measures a currently available bandwidth based on a change tendency of the calculated plurality of difference values.

SUMMARY

In a communication system that transmits and receives data in an order of generation, typical examples of which are a stream distribution system and a video conferencing system, it may be desirable that transmission data be transmitted and received without delay. The transmission data is data to be transmitted to a receiving-side communication device. Examples of the transmission data include video data, audio data, document data and text data. However, in the above-described known bandwidth measurement method, once a packet for measuring the available bandwidth (this packet is hereinafter referred to as a "measurement packet") is transmitted in the communication system, another measurement packet cannot be transmitted until the next transmission timing. Namely, in the communication system, data generated at any given time cannot be transmitted at any given time. Therefore, if data is transmitted using the measurement packets, there is a possibility of delay in data transmission.

Various exemplary embodiments of the general principles herein provide a packet transmission device, a packet transmission method and a computer program product stored on a non-transitory computer-readable medium that can improve a degree of freedom of a transmission timing to transmit transmission data included in a measurement packet.

Exemplary embodiments herein provide a packet transmission device that transmits packets to a receiving-side communication device at a transmission rate corresponding to a measurement bandwidth in order to measure an available bandwidth in a communication system including a plurality of communication devices. The packet transmission device includes a first packet creation portion, a second packet creation portion, a setting portion, a first transmission portion, and a second transmission portion. The first packet creation portion creates a first packet including data for bandwidth measurement. The second packet creation portion creates at least one second packet such that a sum of a data size of the first packet and a data size of the at least one second packet to be created is within a predetermined range including a target value that is set based on the transmission rate. The setting portion sets a transmission interval for the first packet based on the transmission rate. The first transmission portion transmits the first packet created by the first packet creation portion to the receiving-side communication device, at a first timing specified by the transmission interval set by the setting portion. The second transmission portion transmits the at least one second packet created by the second packet creation portion to the receiving-side communication device, at a second timing that is a timing after the first timing and before a point in time when the transmission interval has elapsed from the first timing.

Exemplary embodiments also provide a packet transmission method in which a computer transmits packets to a receiving-side communication device at a transmission rate corresponding to a measurement bandwidth in order to measure an available bandwidth in a communication system including a plurality of communication devices. The packet transmission method includes the steps of creating a first packet including data for bandwidth measurement, creating at least one second packet such that a sum of a data size of the first packet and a data size of the at least one second packet to be created is within a predetermined range including a target value that is set based on the transmission rate, setting a transmission interval for the first packet based on the transmission rate, transmitting the first packet to the receiving-side communication device, at a first timing specified by the transmission interval, and transmitting the at least one second packet to the receiving-side communication device, at a second timing that is a timing after the first timing and before a point in time when the transmission interval has elapsed from the first timing.

Exemplary embodiments further provide a computer program product stored on a non-transitory computer-readable medium that is directed to a computer that is adapted to transmit packets to a receiving-side communication device at a transmission rate corresponding to a measurement bandwidth in order to measure an available bandwidth in a communication system including a plurality of communication devices. The computer program product includes instructions for causing the computer to execute the steps of creating a first packet including data for bandwidth measurement, creating at least one second packet such that a sum of a data size of the first packet and a data size of the at least one second packet to be created is within a predetermined range including a target value that is set based on the transmission rate, setting a transmission interval for the first packet based on the transmission rate, transmitting the first packet to the receiving-side communication device, at a first timing specified by transmission interval, and transmitting the at least one second packet to the receiving-side communication device, at a second timing that is a timing after the first timing and before a point in time when the transmission interval has elapsed from the first timing.

BRIEF DESCRIPTION OF THE DRAWINGS

Exemplary embodiments will be described below in detail with reference to the accompanying drawings in which.

DETAILED DESCRIPTION

Hereinafter, a communication device 1 according to an embodiment will be explained with reference to the drawings. Note that the drawings to be referred to are used to explain technical features that the present invention can adopt. A device configuration, flowcharts of various types of processing, and the like that are shown in the drawings are simply explanatory examples.

Figure 1:
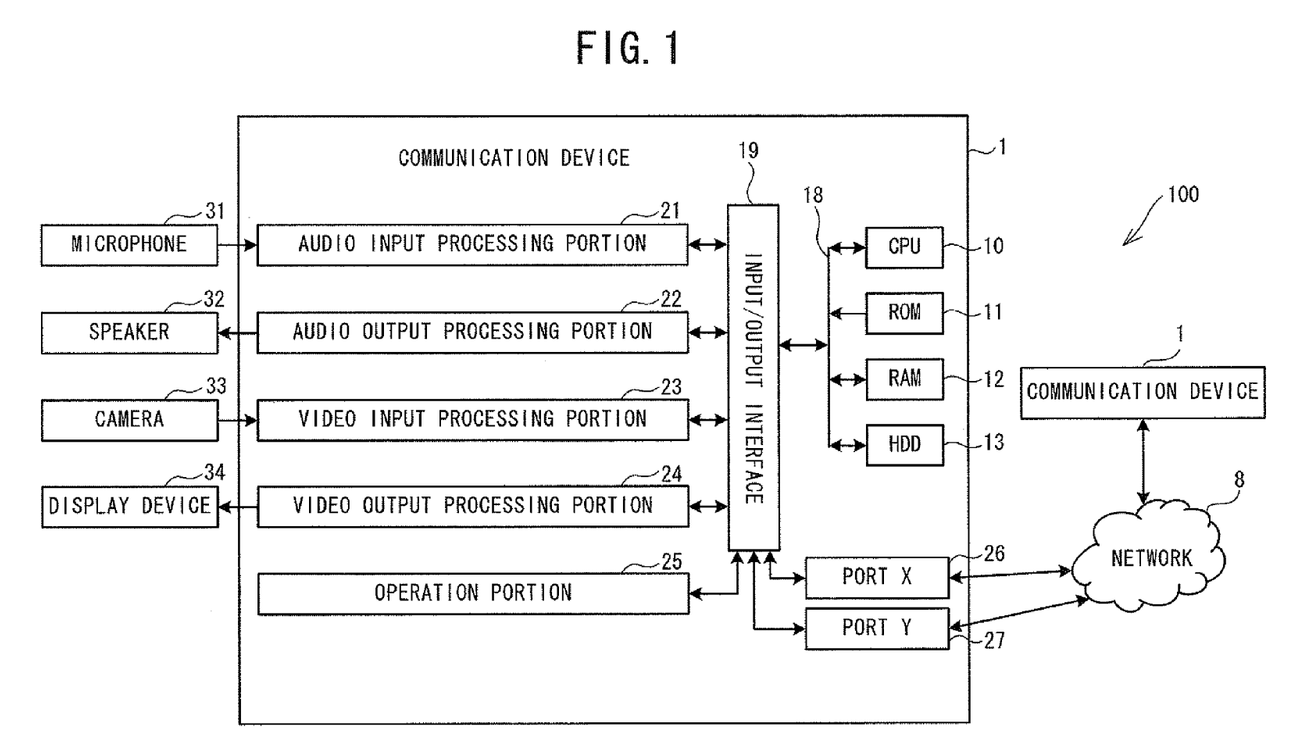
FIG. 1 is a diagram showing an electrical configuration of a communication device and an entire configuration of a communication system.

A communication system 100 will be explained. As shown in FIG. 1, the communication system 100 includes at least two communication devices 1. The communication system 100 of the present embodiment may be used for peer to peer video conferencing in which one of the communication devices 1 and another of the communication devices 1 directly transmit and receive data without involving a server.

Each of the communication devices 1 can be connected to another of the communication devices 1 via a network 8, and is provided with a function to transmit and receive various types of data to and from the other of the communication devices 1. Each of the communication devices 1 is provided with a function as a packet transmission device. When the communication devices 1 are used for video conferencing, they mutually transmit and receive data including, for example, image data, audio data, document data (reference data) and text data. Each of the communication devices 1 may be a communication device dedicated to video conferencing, or may be a personal computer that performs various types of information processing, including a function as a communication device for video conferencing.

In the communication system 100, an available bandwidth for communication with the communication device 1 as a communication counterpart is measured using measurement packets. If the measurement packets are transmitted at a transmission rate that exceeds the available bandwidth, problems may occur such as packet loss and transmission delay, for example. On the other hand, if the measurement packets are transmitted at a transmission rate lower than the available bandwidth, it may not be possible to effectively use the available bandwidth, resulting in poor transmission efficiency. Accordingly, each of the communication devices 1 controls the transmission rate at the time of transmission in accordance with the available bandwidth.

An electrical configuration of the communication device 1 will be explained. As shown in FIG. 1, the communication device 1 includes a CPU 10, a ROM 11, a RAM 12, a hard disk drive (hereinafter referred to as an "HDD") 13 and an input/output interface 19, which are connected with each other by a bus 18.

The CPU 10 performs various types of processing in accordance with programs stored in the ROM 11. The ROM 11 stores programs that can be executed in the communication device 1, and various types of information including initial values that may be referred to when the programs are executed. The RAM 12 temporarily stores various types of information used by the program. The HDD 13 stores programs that can be executed in the communication device 1, and various types of information including initial values that may be referred to when the programs are executed. The communication device 1 may include a storage device such as an EEPROM, a memory card or the like, instead of the HDD 13.

An audio input processing portion 21, an audio output processing portion 22, a video input processing portion 23, a video output processing portion 24, an operation portion 25, a port X 26, and a port Y 27 are connected to the input/output interface 19. The audio input processing portion 21 processes audio data input from a microphone 31. The audio output processing portion 22 causes a speaker 32 to output audio based on the audio data. The video input processing portion 23 processes video data (moving image data) input from a camera 33. The video output processing portion 24 causes a display device 34 to display video based on the video data. The operation portion 25 may be used when a user inputs various types of commands to the communication device 1. The port X 26 and the port Y 27 are external communication interfaces that respectively connect the communication device 1 with the network 8.

Figure 2:
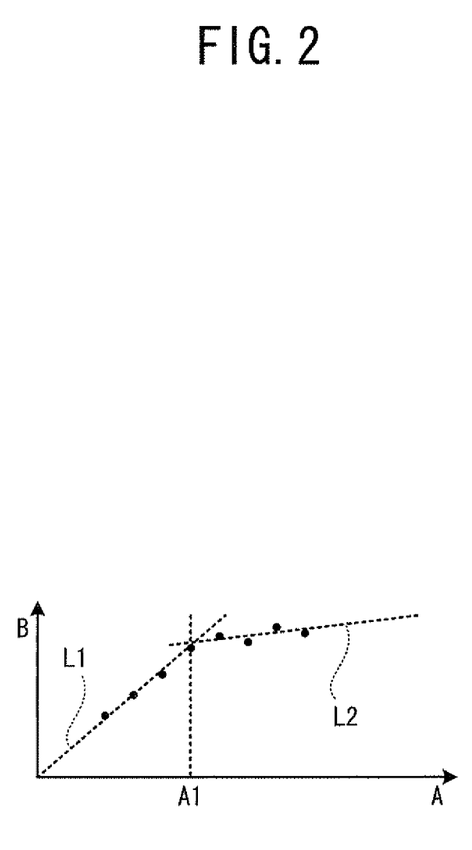
FIG. 2 is an explanatory diagram of a bandwidth measurement method.

An outline of a bandwidth measurement method used in the communication system 100 of the present embodiment will be explained with reference to FIG. 2. The bandwidth measurement method used in the communication system 100 is an improved method of a known method disclosed in, for example, Cao Le Thanh Man et al., "A Study on Inline Network Measurement Mechanism for Service Overlay Networks", Technical Report of IEICE, The Institute of Electronics, Information and Communication Engineers, Jan. 17, 2003, vol. 102, No. 565, pp. 53-58, relevant portions of which are incorporated herein by reference. Note that, the bandwidth measurement method used in the communication system 100 may be an improved method of another bandwidth measurement method that measures the available bandwidth using a packet transmission interval and a packet reception interval.

In order to compare a bandwidth with a transmission rate between the communication devices 1, the bandwidth is expressed as a transmission line capacity (bps). A maximum transmission rate of the bandwidth, in which a receiving-side communication device can receive data at a transmission rate that is almost the same as the transmission rate at the time of transmission, is referred to as the available bandwidth. The available bandwidth may be defined as a bandwidth suitable for communication. In this case, in accordance with a communication purpose, a maximum transmission rate of the bandwidth, in which a degree of delay when data is transmitted and received is within an allowable range, may be determined as the available bandwidth. Further, a predetermined transmission rate that is lower than the maximum transmission rate of the bandwidth, in which the receiving-side communication device can receive data at the transmission rate that is almost the same as the transmission rate at the time of transmission, may be determined as the available bandwidth.

The communication device 1 that transmits measurement packets is hereinafter referred to as a packet transmission device. The communication device 1 that receives the measurement packets is hereinafter referred to as a receiving device. In the communication system 100, the transmission interval is changed on the condition that the data size of the measurement packets transmitted within the transmission interval is constant. If a transmission rate A at the time of transmission is equal to or lower than the available bandwidth, the transmission rate A at the time of transmission is the same as a transmission rate B at the time of reception. Therefore, as shown in FIG. 2, based on an associated relationship between the transmission rate A at the time of transmission and the transmission rate B at the time of reception, an approximate straight line L1 having an inclination of 1 can be obtained. On the other hand, if the transmission rate A at the time of transmission is higher than the available bandwidth, the transmission rate B at the time of reception is lower than the transmission rate A at the time of transmission. Therefore, as shown in FIG. 2, based on the associated relationship between the transmission rate A at the time of transmission and the transmission rate B at the time of reception, an approximate straight line L2 having an inclination smaller than 1 can be obtained. In the communication system 100, a transmission rate A1 at the time of transmission can be identified as the available bandwidth, the transmission rate A1 corresponding to a point (a boundary point) at which the approximate straight line L1 intersects with the approximate straight line L2.

When the communication device 1 functions as the packet transmission device, it creates a first packet and at least one second packet within the transmission interval, and transmits them to the receiving device at separate timings. The first packet includes only data for bandwidth measurement (hereinafter referred to as bandwidth measurement data). The bandwidth measurement data includes at least time data to be used to calculate the transmission interval of the first packets and a transmission destination address of each of the first packets. The bandwidth measurement data of the present embodiment further includes a serial number and a transmission source address of the first packet. The serial number is set to identify each of the first packets. Each of the first packets is transmitted at a timing for each transmission interval (this timing is hereinafter referred to as a "first timing").

Each of the at least one second packet includes transmission data and does not include the bandwidth measurement data. The at least one second packet to be transmitted within the transmission interval is created such that a sum of the data size of the first packet and the data size of the at least one second packet (the sum is hereinafter referred to as a "total size") becomes equal to a target value. In the present embodiment, from a viewpoint of effectively transmitting the transmission data using the measurement packet, a maximum packet size (a maximum transmission unit) is set as the target value. More specifically, the target value in the present embodiment is 1500 bytes. The maximum packet size is a maximum packet size that can be transmitted at a time. The transmission data is data to be transmitted by the packet transmission device to the receiving device. For example, the transmission data includes at least one of the following data: audio data acquired by the audio input processing portion 21, video data acquired by the video input processing portion 23, document data input by the operation portion 25 and text data including various types of commands. The generated transmission data is temporarily stored in a buffer of the HDD 13 as needed. Each of the at least one second packet is transmitted at a timing between the first timing and the next first timing (this timing is hereinafter referred to as a "second timing"). In this manner, the packet transmission device transmits the first packet and the at least one second packet at separate timings, and thereby improves the degree of freedom of the transmission timing of the transmission data.

Transmission main processing that is performed when the communication device 1 operates as the packet transmission device will be explained with reference to FIG. 3 to FIG. 7. When a command to transmit and receive data between the packet transmission device and the receiving device is input, the transmission main processing is performed by the CPU 10 of the communication device 1 in accordance with the instructions included in the program stored in the HDD 13. Note that explanation of processing similar to that of the above-described known method will be simplified.

Figure 3:
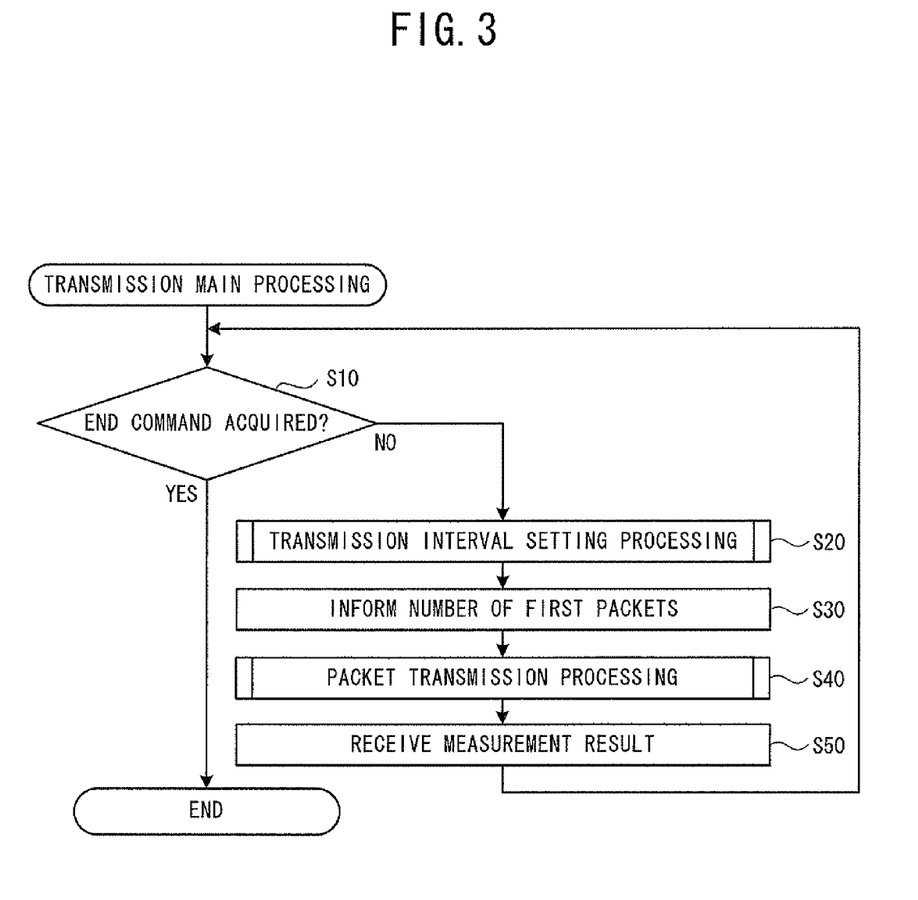
FIG. 3 is a flowchart of transmission main processing that is performed when the communication device operates as a packet transmission device.

As shown in FIG. 3, when the transmission main processing is started, the CPU 10 determines whether or not an end command has been acquired (step S10). The end command is a command to end processing for measuring the available bandwidth. The end command may be acquired when the user inputs the end command to the communication device 1 by operating the operation portion 25, or when the end command is transmitted from another of the communication devices 1. In a case where the end command has not been acquired (no at step S10), the CPU 10 performs transmission interval setting processing (step S20). In the transmission interval setting processing, the CPU 10 sets the intervals to transmit the first packets based on a measurement bandwidth. The measurement bandwidth is a bandwidth that is expected to include a current available bandwidth, and is a bandwidth that is a target of measurement. The measurement bandwidth may be set using a known method. In the present embodiment, the measurement bandwidth is set in the following manner. If there is a measurement result of the previous cycle, the CPU 10 sets the measurement bandwidth based on an associated relationship between a measurement result and a measurement bandwidth obtained before the previous cycle. The associated relationship between the measurement result and the measurement bandwidth obtained before the previous cycle is stored in the HDD 13 in advance. If there is no measurement result of the previous cycle, the CPU 10 sets, as the measurement bandwidth, a range from a lower limit value to an upper limit value (500 kbps to 1.5 Mbps) of the bandwidth that may be used for normal communication.

Figure 4:
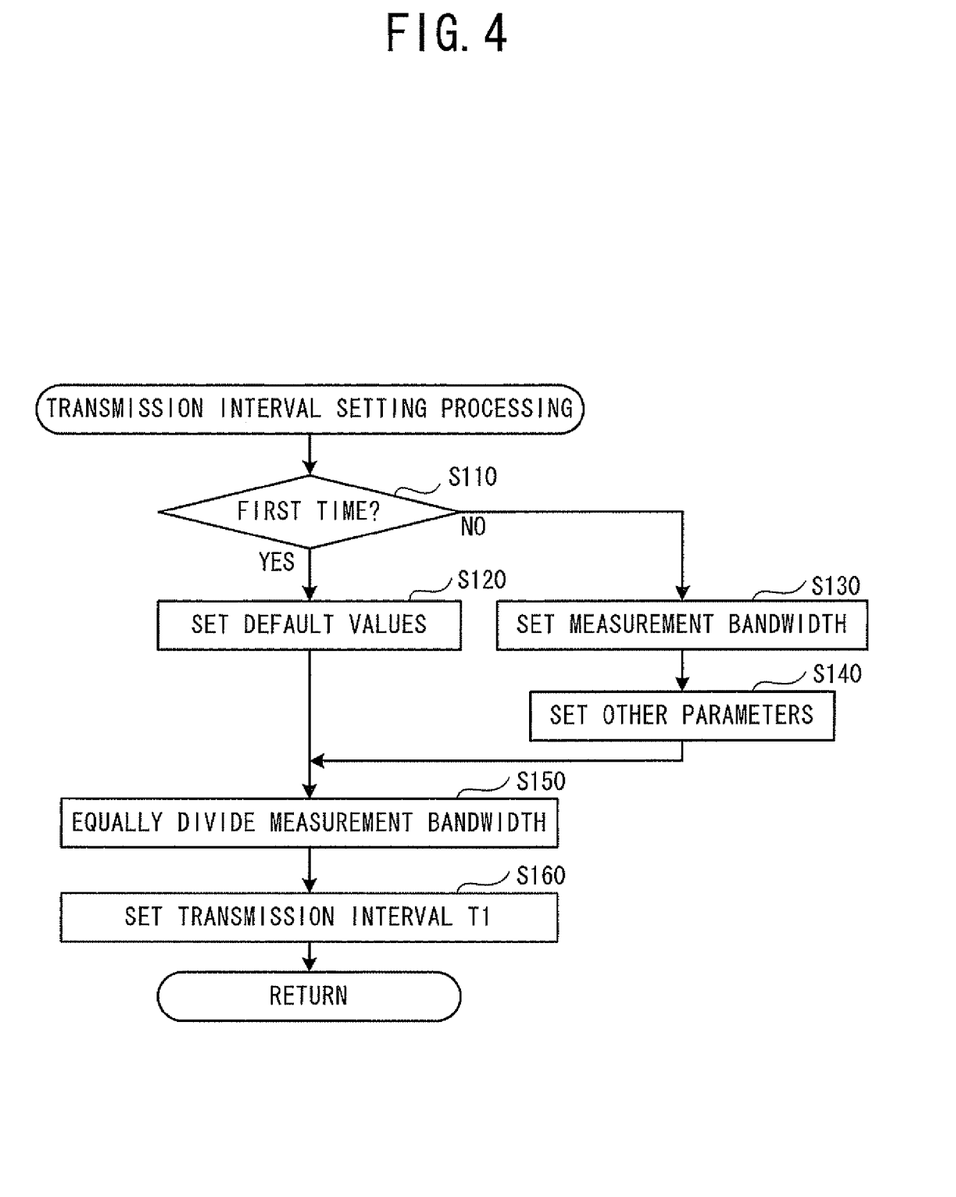
FIG. 4 is a flowchart of transmission interval setting processing that is performed in the transmission main processing shown in FIG. 3.

The transmission interval setting processing will be explained in more detail with reference to FIG. 4. The CPU 10 determines, based on a determination flag stored in the RAM 12, for example, whether or not the transmission interval setting processing is being performed for the first time after the communication device 1 has been activated (step S110). For example, the determination flag may be set to false when the communication device 1 is activated, and may be set to true after the processing at step S110 has been performed after the activation. In a case where the processing at step S110 is not performed for a predetermined period of time after the determination flag has been set to true, processing to set the determination flag to false may be performed. In a case where the transmission interval setting processing is being performed for the first time (yes at step S110), the CPU 10 sets default values to various types of parameters and stores the set parameters in the RAM 12 (step S120). Examples of the parameters set at step S120 include the target value of the total size, the measurement bandwidth and a number of the first packets. The number of the first packets is the number of the first packets to be transmitted at predetermined intervals during one measurement cycle. The target value of the total size may be set to 1500 bytes, for example. The measurement bandwidth may be set to 500 kbps to 1.5 Mbps, for example. The number of the first packets may be set to 25, for example.

In a case where the processing at step S110 is not the processing that is performed for the first time (no at step S110), the CPU 10 sets the measurement bandwidth of this cycle based on the associated relationship between the measurement result and the measurement bandwidth obtained in the previous cycle and before, and stores the set measurement bandwidth in the RAM 12 (step S130). The CPU 10 sets values of the previous cycle as the parameters (the target value of the total size and the number of the first packets) other than the measurement bandwidth, and stores the set parameters in the RAM 12 (step S 140).

Following step S120 or step S140, the CPU 10 equally divides the measurement bandwidth by the number of the first packets, and stores in the RAM 12 divided measurement bandwidths obtained by equally dividing the measurement bandwidth (step S150). The measurement bandwidth is specified by the values set at step S120 or step S 130, and the number of the first packets is specified by the value set at step S120 or step S140. In a case where the measurement bandwidth ranges from 500 kbps to 1.5 Mbps, the range from 500 kbps to 1.5 Mbps is divided by 25, and divided into units of 40 kbps each. Next, the CPU 10 calculates a transmission interval T1 for the first packet for each of the divided measurement bandwidths, and stores the calculated transmission intervals T1 for the respective divided measurement bandwidths in the RAM 12 (step S 160). If the target value of the total size is 1500 bytes and a representative value of one of the divided measurement bandwidths is 500 kbps, for example, the transmission interval T1 can be set to 24 msec based on (1500×8)/(500×1000). The representative value of each of the divided measurement bandwidths may be, for example, a lower limit value of each of the divided measurement bandwidths created at step S150. The CPU 10 ends the transmission interval setting processing and returns to the transmission main processing shown in FIG. 3.

As shown in FIG. 3, after the above-described transmission interval setting processing (step S20) has ended, the CPU 10 transmits the number of the first packets to the receiving device (step S30). The processing performed at step S30 is processing in which the packet transmission device notifies the receiving device in advance of how many sets of measurement packets are to be used to measure the available bandwidth. One set of measurement packets is transmitted within the transmission interval T1, and includes one first packet and at least one second packet, the total size of which is the target value. Although details will be described later with reference to FIG. 8, after receiving the number of the first packets, if the receiving device has received n sets of measurement packets (n is the number of the first packets), the receiving device determines that it has received all the measurement packets. Next, the CPU 10 performs packet transmission processing (step S40). In the packet transmission processing, the CPU 10 transmits the first packet and the at least one second packet at separate timings within the transmission interval T1. The CPU 10 sequentially reads out the transmission intervals T1 that have been set for the divided measurement bandwidths, respectively, and changes the transmission intervals T1.

Figure 5:
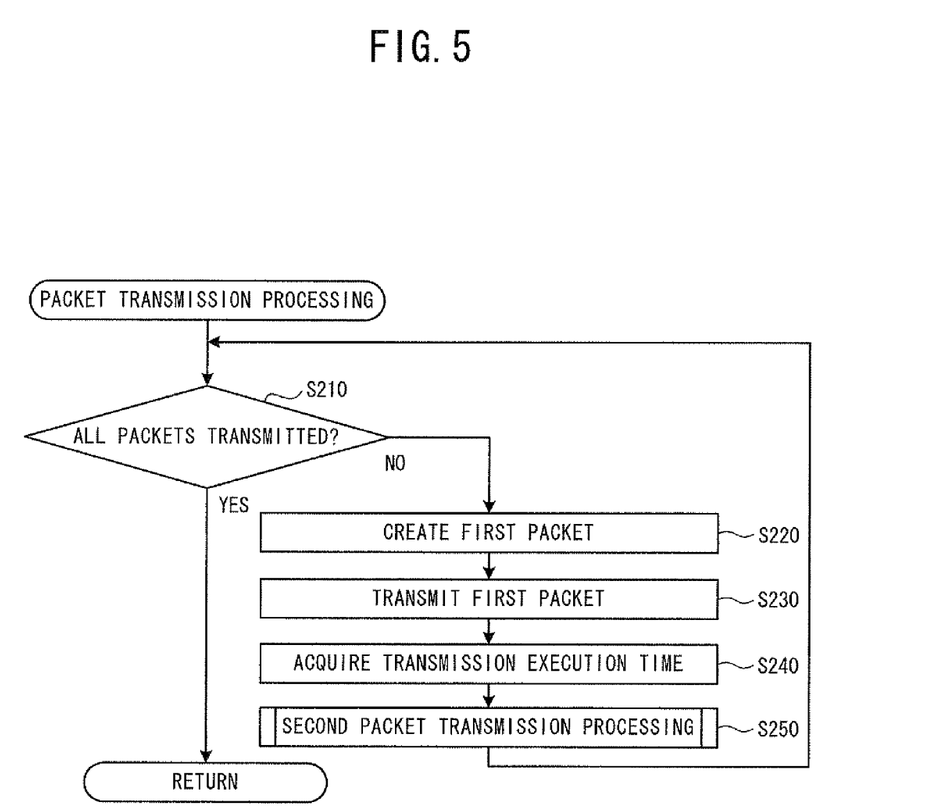
FIG. 5 is a flowchart of packet transmission processing that is performed in the transmission main processing shown in FIG. 3.

The packet transmission processing will be explained in more detail with reference to FIG. 5 and FIG. 6. As shown in FIG. 5, the CPU 10 determines whether or not it has transmitted all the n sets of measurement packets (n is the number of the first packets) (step S210). In a case where the CPU 10 has not yet transmitted all the measurement packets (no at step S210), the CPU 10 creates a new first packet and stores the created first packet in the RAM 12 (step S220). At step S220, the CPU 10 creates the first packet that only includes bandwidth measurement data. Further, at step S220 that is repeatedly performed, the CPU 10 sequentially reads out the transmission intervals T1 that have been set for the divided measurement bandwidths at step S160 of the transmission interval processing (refer to FIG. 4), and stores the read out transmission interval T1 each time in the RAM 12.

The CPU 10 transmits the first packet created at step S220 to the port X 26 of the receiving device, via the port X 26 or the port Y 27 of the packet transmission device and the network 8 (step S230). By the processing at step S230 that is repeatedly performed, first packets 211 to 214 are sequentially transmitted to the receiving device every time the first timing arrives, as shown in FIG. 6. In the first embodiment, time periods 201, 202 and 203, which indicate the lengths between the first timings denoted by a time ti, a time t3, a time t6 and a time t10 in FIG. 6, correspond to the transmission intervals T1 set for the divided measurement bandwidths at step S160 of the transmission interval setting processing (refer to FIG. 4).

The CPU 10 acquires a current time as a transmission execution time, and stores the acquired transmission execution time in the RAM 12 (step S240). Time required to transmit the first packet may be short enough to be neglected. Therefore, the transmission execution time acquired at step S240 can be considered as a transmission start time. The CPU 10 performs second packet transmission processing (step S250). In the second packet transmission processing, the CPU 10 creates the at least one second packet such that the total size becomes equal to the target value. The target value is the value that has been set at step S120 or step S140. The CPU 10 transmits the created at least one second packet at the second timing. The second timing is before the point in time when the transmission interval T1 read out at step S220 has elapsed from the time when the first packet was transmitted at step S230.

The second packet transmission processing will be explained in more detail with reference to FIG. 6 and FIG. 7. As shown in FIG. 7, the CPU 10 determines whether or not the packets whose total size is equal to the target value have been transmitted to the receiving device (step S310). More specifically, if a current total size stored in the RAM 12 is the same as the target value, the CPU 10 determines that the packets whose total size is equal to the target value have been transmitted. An initial value of the current total size is the data size of the first packet that has been created at step S220 of the packet transmission processing (refer to FIG. 5) and transmitted at step S230. The current total size is updated every time a second packet is transmitted.

Processing to be performed in a case where the current total size is equal to the target value (yes at step S310) will be described later. In a case where the current total size is not equal to the target value (no at step S310), the CPU 10 acquires a current time and stores the acquired current time in the RAM 12 (step S340). The CPU 10 determines whether or not sufficient time is left to transmit a new second packet that includes transmission data (step S350). More specifically, the CPU 10 determines that there is sufficient time to transmit the new second packet, if the transmission interval T1 read out at step S220 is longer than a sum of an elapsed time from the transmission execution time acquired at step S240 to the current time acquired at step S340 and a predetermined time that is necessary to create and transmit a second packet. The predetermined time that is necessary to create and transmit the second packet may be set in advance and stored in the HDD 13. In a case where sufficient time is left (yes at step S350), the CPU 10 acquires the transmission data and stores the acquired transmission data in the RAM 12 (step S360). The transmission data may be stored in the buffer of the HDD 13 as needed. Therefore, the CPU 10 may acquire the transmission data from the buffer.

The CPU 10 determines whether or not the transmission data that has been acquired at step S360 has a size that is equal to or smaller than a transmittable size (step S370). The transmittable size may be expressed as a value obtained by subtracting the current total size and a predetermined amount from the target value. The predetermined amount indicates the size of data to be included in the second packet other than the transmission data. The data other than the transmission data may be identification data, for example. In a case where the data size of the acquired transmission data is larger than the transmittable size (no at step S370), the CPU 10 returns to the processing at step S310. In a case where the size of the transmission data that has been acquired is equal to or smaller than the transmittable size (yes at step S370), the CPU 10 creates a new second packet that includes the acquired transmission data and stores the created second packet in the RAM 12 (step S380). The CPU 10 transmits the created second packet to the port Y 27 of the receiving device, via the port X 26 or the port Y 27 of the packet transmission device and the network 8 (step S390). In this manner, the CPU 10 transmits the second packet to the port that is different from the port at which the receiving device receives the first packet. The CPU 10 returns to the processing at step S310.

Figure 6:
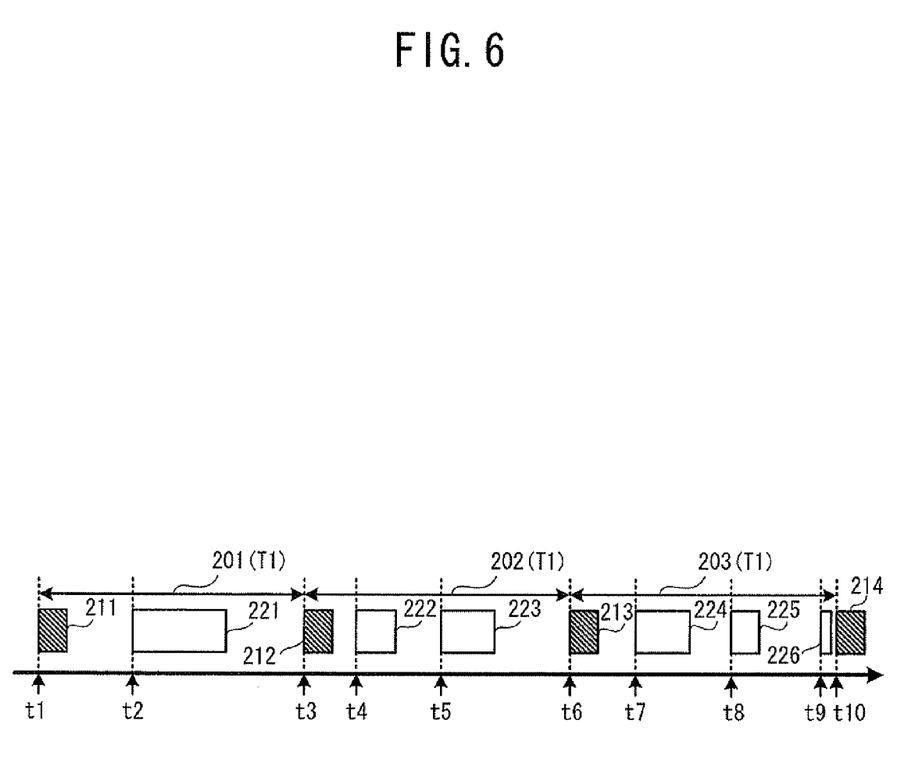
FIG. 6 is an explanatory diagram showing timings at which first packets and second packets are transmitted in the transmission main processing.
Figure 7:
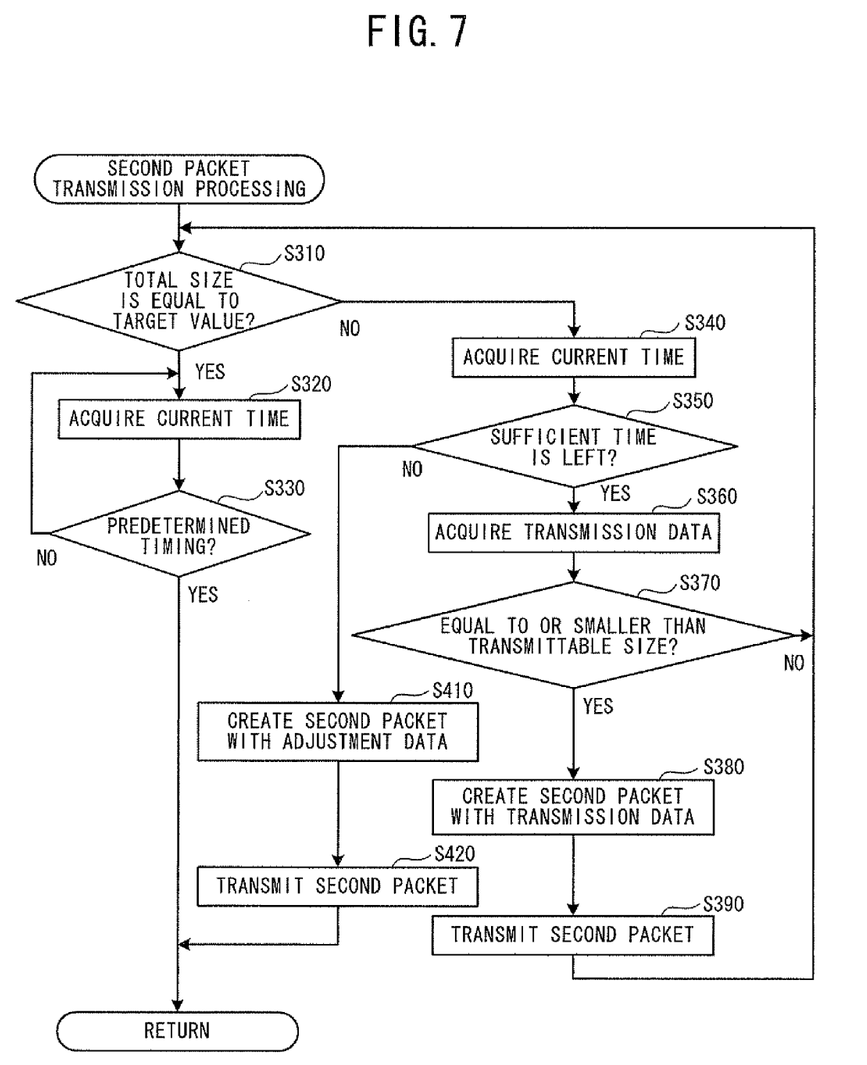
FIG. 7 is a flowchart of second packet transmission processing that is performed in the packet transmission processing shown in FIG. 5.

Like a second packet 221 that is transmitted within the time period 201 shown in FIG. 6, one second packet may be transmitted within the transmission interval T1. Like second packets 222 and 223 that are transmitted within the time period 202, a plurality of second packets may be transmitted within the transmission interval T1. Note, however, that a sum of the data size of the first packet 211 and the data size of the second packet 221 that are transmitted in the time period 201 is equal to the target value. In a similar manner, a sum of the data size of the first packet 212 and the data size of the second packets 222 and 223 that are transmitted in the time period 202 is equal to the target value.

In a case where sufficient time is not left to transmit a new second packet (no at step S350), the CPU 10 creates a new second packet using adjustment data and stores the created second packet in the RAM 12 (step S410). The adjustment data is data for adjusting the data size of a second packet to be newly created such that the total size becomes equal to the target value. The CPU 10 transmits the created second packet to the port Y 27 of the receiving device, via the port X 26 or the port Y 27 of the packet transmission device and the network 8 (step S420). Then, the CPU 10 ends the second packet transmission processing and returns to the packet transmission processing shown in FIG. 5. For example, in the time period 203 shown in FIG. 6, the total size has not yet reached the target value at the point in time when second packets 224 and 225 are respectively transmitted at a time t7 and a time t8 after the first packet 213 has been transmitted at the time t6. In such a case, in order to adjust the total size, a second packet 226 that includes the adjustment data is transmitted at a time t9.

In a case where the current total size is equal to the target value (yes at step S310), the CPU 10 acquires a current time and stores the acquired current time in the RAM 12 (step S320). The CPU 10 determines whether or not it is a predetermined timing (step S330). The predetermined timing is a timing at which the elapsed time from the transmission execution time acquired at step S240 to the current time acquired at step S320 becomes equal to the transmission interval T1 read out at step S220. When it is not the predetermined timing (no at step S330), the CPU 10 returns to the processing at step S320. When it is the predetermined timing (yes at step S330), or after performing the processing at step 5420, the CPU 10 ends the second packet transmission processing and returns to the packet transmission processing shown in FIG. 5. Because the processing at step S250 has been completed in the packet transmission processing shown in FIG. 5, the CPU 10 returns to the processing at step S210. When the CPU 10 has transmitted all the measurement packets (yes at step S210), the CPU 10 ends the packet transmission processing and returns to the main processing shown in FIG. 3.

After the packet transmission processing shown in FIG. 5 ends in the main processing shown in FIG. 3 (step S40), the CPU 10 receives a measurement result of the available bandwidth and stores the received measurement result in the RAM 12 (step S50). The measurement result is transmitted from the receiving device that performs reception main processing, which will be described later with reference to FIG. 8. The CPU 10 returns to the processing at step S10. In a case where an end command is acquired (yes at step S10), the transmission main processing ends. In the manner described above, the CPU 10 performs the transmission main processing of the first embodiment.

The reception main processing will be briefly explained with reference to FIG. 8 and FIG. 9. The reception main processing is performed when the communication device 1 functions as the receiving device. When a command to transmit and receive data between the reception device and the packet transmission device is input, the reception main processing is performed by the CPU 10 of the receiving device in accordance with instructions included in the program stored in the HDD 13. Note that processing that is similar to that of the above-described known method will be simply explained.

Figure 8:
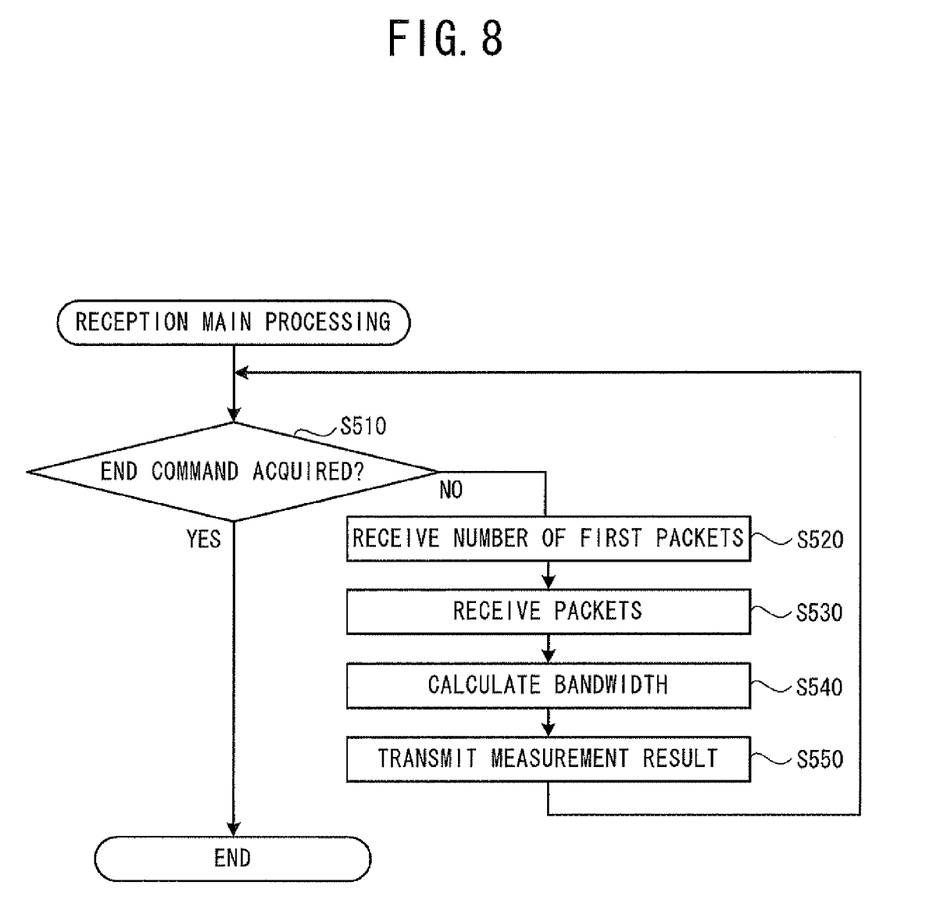
FIG. 8 is a flowchart of reception main processing that is performed when the communication device operates as a receiving device.
Figure 9:
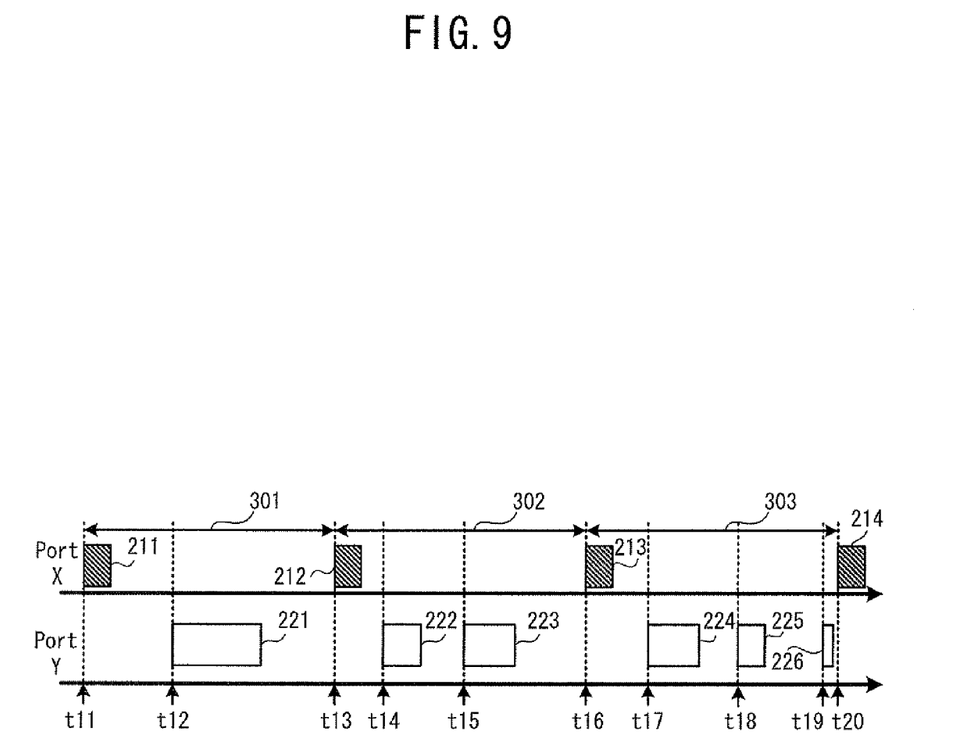
FIG. 9 is an explanatory diagram showing timings at which the first packets and the second packets are received in the reception main processing.

As shown in FIG. 8, the CPU 10 determines whether or not an end command has been acquired (step S510). The end command is acquired when the user inputs the end command to the communication device 1 by operating the operation portion 25, or when the end command is transmitted from another of the communication devices 1. In a case where the end command has not been acquired (no at step S510), the CPU 10 receives the number of the first packets that is to be transmitted from the packet transmission device, and stores the received number of the first packets in the RAM 12 (step S520). The CPU 10 receives n sets of first and second packets (n is the received number of the first packets) as the measurement packets, and stores the received measurement packets in the RAM 12 or the HDD 13 (step S530). As shown in FIG. 9, the first packets 211 to 214 transmitted from the packet transmission device are received via the port X 26 of the receiving device. The second packets 221 to 226 transmitted from the packet transmission device are received via the port Y 27 of the receiving device. Each time the first packet is received, the CPU 10 acquires a reception time and stores the acquired reception time in the RAM 12. In the example shown in FIG. 9, current times corresponding to a time 01, a time t13, a time t16 and a time t20 at which the first packets 211, 212, 213 and 214 are respectively received are acquired as the reception times.

The CPU 10 calculates the available bandwidth based on the reception intervals and the transmission intervals of the first packets, and stores the calculated available bandwidth in the RAM 12 (step S540). The reception intervals of the first packets are calculated based on the reception times acquired at step S530. The reception intervals of the first packets are expressed as the lengths of time periods 301, 302 and 303 in FIG. 9. The transmission intervals T1 of the first packets are identified based on the transmission times included in the bandwidth measurement data of the first packets. The transmission intervals T1 of the first packets are expressed as the lengths of the time periods 201, 202 and 203 in FIG. 6. A known method can be used, as appropriate, as a method for identifying the available bandwidth based on the reception intervals and the transmission intervals. In the present embodiment, the available bandwidth may be identified based on the above-described known measurement principle. The CPU 10 transmits the calculated available bandwidth to the packet transmission device (step S550), and returns to the processing at step S510. In a case where the end command has been acquired (yes at step S510), the CPU 10 ends the reception main processing.

According to the communication device 1 of the present embodiment, on the condition that the total size of the data transmitted within the transmission interval T1 is equal to the target value, the transmission data can be transmitted to the receiving device at any given timing within the transmission interval T1. Accordingly, it may be possible to improve the degree of freedom of the timing at which the transmission data included in the measurement packet is transmitted. More specifically, in the communication device 1, there may be no need to include data for data identification in the first packet, and therefore it may be possible to increase the amount of data that can be included in the second packet.

In a case where the bandwidth measurement data and other data are transmitted together in one packet, it is necessary to transmit the other data using a protocol for the bandwidth measurement data. Therefore, with a known device, there is a possibility of deterioration in transmission efficiency and transmission quality. In contrast, with the communication device 1, even when the transmission data is included in the measurement packet, the first packet for the bandwidth measurement data and the second packet for the transmission data are separately transmitted. Therefore, it may be possible to transmit the transmission data using a protocol appropriate for the transmission data. Further, with the communication device 1, it may be possible to reduce data coupling processing, compared to a case where the bandwidth measurement data and the transmission data are included in the same packet.

In the first embodiment, the first packet is transmitted to the port X 26 of the receiving device and the second packet is transmitted to the port Y 27 that is different from the port X 26. As a result, data to identify whether the transmitted packet is the first packet or the second packet need not be included in each packet. Therefore, the communication device 1 can omit data for identifying the packet type. Thus, it may be possible to increase the amount of data that can be included in the second packet, compared to a case where the data for identifying the packet type is included in each packet. Furthermore, in the receiving device, only the first packets may be set as a target to monitor the reception time. As a result, it may be possible to reduce a processing load on the receiving-side communication device.

When the packet transmission device (the communication device 1) of the first embodiment creates a second packet that makes the total size equal to the target value, the packet transmission device adjusts the data size of the second packet using the adjustment data, as needed. Instead of this, like a packet transmission device of a second embodiment that will be described below, in a case where the total size is within a predetermined range, but the second packet cannot be created such that the total size becomes equal to the target value, the measurement packet may be transmitted at a predetermined transmission rate by changing the transmission interval. Hereinafter, transmission main processing performed by the packet transmission device of the second embodiment will be explained.

Figure 10:
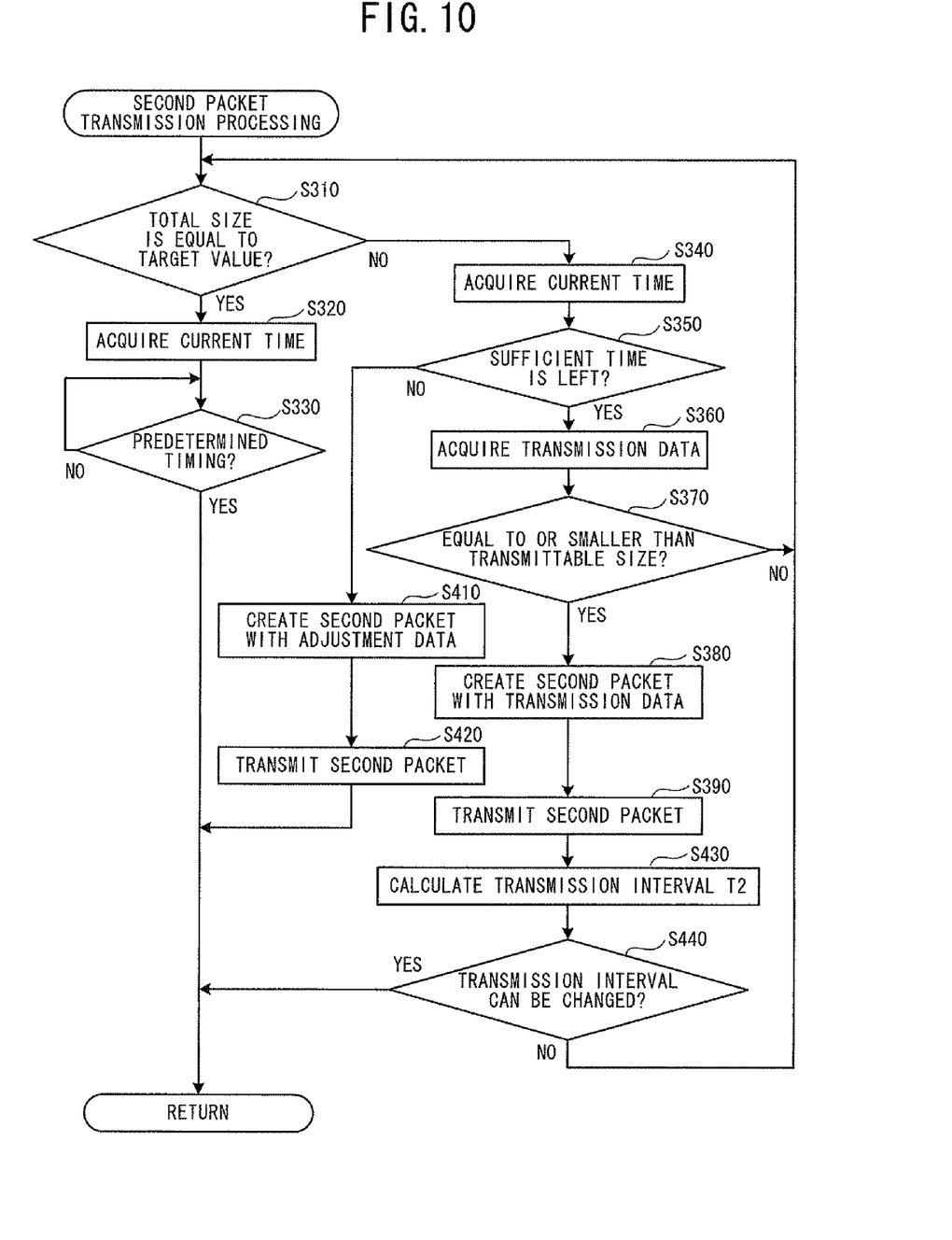
FIG. 10 is a flowchart of second packet transmission processing according to another embodiment.

Although not shown in the drawings, the transmission main processing of the second embodiment is different from the transmission main processing of the first embodiment in second packet transmission processing. An explanation about processing same as that in the transmission main processing of the first embodiment is omitted, and the second packet transmission processing of the second embodiment will be explained below with reference to FIG. 10. In FIG. 10, the same step numbers are assigned to steps in which processing same as that of the second packet transmission processing of the first embodiment shown in FIG. 7 is performed. As shown in FIG. 10, the transmission main processing of the second embodiment is different from the transmission main processing of the first embodiment in that step S430 and step S440 are performed.

At step S430, the CPU 10 calculates a transmission interval T2 and stores the calculated transmission interval T2 in the RAM 12. The transmission interval T2 is calculated by dividing the current total size by a representative value of the current divided measurement bandwidth. The transmission interval T2 is used to transmit the measurement packets at a predetermined transmission rate by adjusting the transmission interval T2.

At step S440, the CPU 10 determines whether or not the transmission rate at the time of transmission can be adjusted to a predetermined value by changing the transmission interval T1 to the transmission interval T2. More specifically, the CPU 10 determines that the transmission interval can be changed if the transmission interval T2 calculated at step S430 is longer than the elapsed time from the transmission execution time acquired at step S240 shown in FIG. 5 to the current time acquired at step S350. If the transmission interval can be changed (yes at step S440), the CPU 10 ends the second packet transmission processing after waiting until the elapsed time from the transmission execution time acquired at step S240 shown in FIG. 5 becomes equal to the transmission interval T2 calculated at step S430. If the transmission interval cannot be changed (no at step S440), the CPU 10 returns to the processing at step S310.

In the communication device 1 of the second embodiment, because the total size is set to be equal to the target value, the processing to determine the transmission interval such that the transmission rate corresponds to the measurement bandwidth can be easily performed. Further, the communication device 1 can improve the degree of freedom of the timing at which the transmission data included in the measurement packet is transmitted, without deteriorating measurement accuracy. More specifically, in a case where the communication device 1 cannot create the second packet using the transmission data such that the total size becomes equal to the target value, the communication device 1 performs the following processing. If the transmission interval can be adjusted (yes at step S440), the communication device 1 changes the transmission interval T1 to the transmission interval T2 in order to adjust the transmission rate at the time of transmission. If the transmission interval cannot be adjusted (no at step S440), the communication device 1 creates the second packet that includes the adjustment data used to adjust the data size (step S410), and transmits the created second packet to the receiving device (step S420). In other words, the communication device 1 can switch an adjustment method of the transmission rate such that, as much as possible, the adjustment data is not used. Further, because the communication device 1 performs the processing that determines whether or not the transmission interval can be adjusted (step S430 and step S440) after it has transmitted the second packet that includes the transmission data (step S390), the communication device 1 can reliably avoid a situation in which only the first packet is transmitted within the transmission interval.

Note that the present invention is not limited to the above-described embodiments, and various modifications may be made without departing from the spirit and scope of the present invention. For example, any one of the following modifications (A) to (D) may be made as appropriate.

(A) In the above-described embodiments, the communication device 1 that has a function as a packet transmission device is described as an example. However, the present invention is not limited to this example. For example, the packet transmission device may be a dedicated machine that transmits measurement packets, or may be a packet transmission device that transmits a plural types of packets including the measurement packets. In a case where the packet transmission device is a dedicated machine that transmits the measurement packets, the transmission data included in the measurement packets may be generated by the packet transmission device, or may be generated by a device other than the packet transmission device. In a case where the transmission data is generated by the device other than the packet transmission device, the transmission data may be acquired from the device other than the packet transmission device via the network or the like. Further, in the above-described embodiments, a case is described in which the communication device 1 is used for video conferencing. However, the communication device 1 may be used for streaming distribution, for example. The type of the transmission data may be changed depending on the purpose of the packet transmission device. In addition, the configuration of the packet transmission device can be changed as appropriate. For example, although the above-described communication device 1 is provided with the port X 26 and the port Y 27, it may be provided with a single external communication interface.

(B) Although in the above-described embodiments, the first packet only includes the bandwidth measurement data, the first packet may include other data. Similarly, although the second packet of the above-described embodiments is created such that the total size becomes equal to a target value, the second packet may be created such that the total size is within a predetermined range that includes the target value. The predetermined range may be determined as appropriate in consideration of measurement accuracy of the available bandwidth, (C) Although the communication device 1 of the above-described embodiments transmits the first packet and the second packet to separate ports of the receiving device, the communication device 1 may transmit the first packet and the second packet to the same port. In a case where the packet transmission device is provided with a plurality of transmission ports, the packet transmission device may transmit the first packet and the second packet from the respective ports.

(D) the transmission rate when the measurement packet is transmitted may be adjusted based on at least one of the total size and the transmission interval.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A packet transmission device that transmits packets to a receiving-side communication device at a transmission rate corresponding to a measurement bandwidth in order to measure an available bandwidth in a communication system including a plurality of communication devices, the packet transmission device comprising:
a processor;
a memory storing a program that is to be executed by the processor and, when executed, causes the processor to perform the functions of:
a first packet creation portion that creates a first packet including data for bandwidth measurement;
a second packet creation portion that creates at least one second packet such that a sum of a data size of the first packet and a data size of the at least one second packet to be created is within a predetermined range including a target value that is set based on the transmission rate;
a setting portion that sets a transmission interval for the first packet based on the transmission rate;
a first transmission portion that transmits the first packet created by the first packet creation portion to the receiving-side communication device, at a first timing specified by the transmission interval set by the setting portion; and
a second transmission portion that transmits the at least one second packet created by the second packet creation portion to the receiving-side communication device, at a second timing that is a timing after the first timing and before a point in time when the transmission interval has elapsed from the first timing.

2. The packet transmission device according to claim 1, further comprising:
a transmission data acquisition portion that acquires transmission data to be transmitted to the receiving-side communication device,
wherein
the first packet creation portion creates the first packet that includes only the data for bandwidth measurement, and
the second packet creation portion creates, as the at least one second packet, at least one packet that includes at least the transmission data acquired by the transmission data acquisition portion.

3. The packet transmission device according to claim 2, wherein
in a case where, if the at least one packet that includes only the transmission data is created as the at least one second packet, the sum does not equal the target value, the second packet creation portion creates, as the at least one second packet, the at least one packet that includes the transmission data and adjustment data for adjusting a packet data size such that the sum becomes equal to the target value.

4. The packet transmission device according to claim 2, wherein
in a case where, if the at least one packet that includes only the transmission data is created as the at least one second packet, the sum does not equal the target value, the setting portion resets the transmission interval in accordance with the transmission rate and with a total sum of the data size of the first packet that has already been transmitted and the data size of the at least one second packet that has already been transmitted.

5. The packet transmission device according to claim 1, wherein:
the first transmission portion transmits the first packet to a first port provided in the receiving-side communication device; and
the second transmission portion transmits the second packet to a second port that is a port provided in the receiving-side communication device and that is different from the first port.

6. A packet transmission method in which a computer transmits packets to a receiving-side communication device at a transmission rate corresponding to a measurement bandwidth in order to measure an available bandwidth in a communication system including a plurality of communication devices, the packet transmission method comprising the steps of:
creating a first packet including data for bandwidth measurement;
creating at least one second packet such that a sum of a data size of the first packet and a data size of the at least one second packet to be created is within a predetermined range including a target value that is set based on the transmission rate;
setting a transmission interval for the first packet based on the transmission rate;
transmitting the first packet to the receiving-side communication device, at a first timing specified by the transmission interval; and
transmitting the at least one second packet to the receiving-side communication device, at a second timing that is a timing after the first timing and before a point in time when the transmission interval has elapsed from the first timing.

7. The packet transmission method according to claim 6, further comprising the step of acquiring transmission data to be transmitted to the receiving-side communication device, wherein:
the first packet includes only the data for bandwidth measurement; and
the at least one second packet is at least one packet that includes at least the acquired transmission data.

8. The packet transmission method according to claim 7, wherein
in a case where, if the at least one packet that includes only the transmission data is created as the at least one second packet, the sum does not equal the target value, the at least one second packet is created as the at least one packet that includes the transmission data and adjustment data for adjusting a packet data size such that the sum becomes equal to the target value.

9. The packet transmission method according to claim 7, further comprising the step of resetting the transmission interval in accordance with the transmission rate and with a total sum of the data size of the first packet that has already been transmitted and the data size of the at least one second packet that has already been transmitted, in a case where, if the at least one packet that includes only the transmission data is created as the at least one second packet, the sum does not equal the target value.

10. The packet transmission method according to claim 6, wherein:
the first packet is transmitted to a first port provided in the receiving-side communication device; and
the at least one second packet is transmitted to a second port that is a port provided in the receiving-side communication device and that is different from the first port.

11. A computer program product stored on a non-transitory computer-readable medium, the computer program product being directed to a computer that is adapted to transmit packets to a receiving-side communication device at a transmission rate corresponding to a measurement bandwidth in order to measure an available bandwidth in a communication system including a plurality of communication devices, and the computer program product comprising instructions for causing the computer to execute the steps of:
creating a first packet including data for bandwidth measurement;
creating at least one second packet such that a sum of a data size of the first packet and a data size of the at least one second packet to be created is within a predetermined range including a target value that is set based on the transmission rate;
setting a transmission interval for the first packet based on the transmission rate;
transmitting the first packet to the receiving-side communication device, at a first timing specified by transmission interval; and
transmitting the at least one second packet to the receiving-side communication device, at a second timing that is a timing after the first timing and before a point in time when the transmission interval has elapsed from the first timing.

12. The computer program product according to claim 11, further comprising instructions for causing the computer to execute the step of acquiring transmission data to be transmitted to the receiving-side communication device, wherein:
the first packet includes only the data for bandwidth measurement; and the at least one second packet is at least one packet that includes at least the acquired transmission data.

13. The computer program product according to claim 12, wherein
in a case where, if the at least one packet that includes only the transmission data is created as the at least one second packet, the sum does not equal the target value, the at least one second packet is created as the at least one packet that includes the transmission data and adjustment data for adjusting a packet data size such that the sum becomes equal to the target value.

14. The computer program product according to claim 12, further comprising instructions for causing the computer to execute the step of resetting the transmission interval in accordance with the transmission rate and with a total sum of the data size of the first packet that has already been transmitted and the data size of the at least one second packet that has already been transmitted, in a case where, if the at least one packet that includes only the transmission data is created as the at least one second packet, the sum does not equal the target value.

15. The computer program product according to claim 11, wherein:
the first packet is transmitted to a first port provided in the receiving-side communication device; and
the at least one second packet is transmitted to a second port that is a port provided in the receiving-side communication device and that is different from the first port.

16. The packet transmission device according to claim 2, wherein
the transmission data includes at least one of audio data, video data, document data, or text data.

17. The packet transmission device according to claim 1, wherein
the transmission interval is set based on default values if transmission processing is occurring for the first time, otherwise the transmission interval is set based on the associated relationship between a measurement result and a measurement bandwidth obtained in a previous cycle.

18. The packet transmission method according to claim 7, wherein
the transmission data includes at least one of audio data, video data, document data, or text data.

19. The computer program product according to claim 12, wherein
the transmission data includes at least one of audio data, video data, document data, or text data.

20. The computer program product according to claim 11, wherein
the transmission interval is set based on default values if transmission processing is occurring for the first time, otherwise the transmission interval is set based on the associated relationship between a measurement result and a measurement bandwidth obtained in a previous cycle.

* * * * *